3,185,813
WELDING PROCESS AND COMPOSITION THEREFOR
Harry E. Kennedy, Berkeley, Calif., assignor to Union Carbide Corporation, a corporation of New York
Filed Jan. 3, 1963, Ser. No. 249,218
20 Claims. (Cl. 219—74)

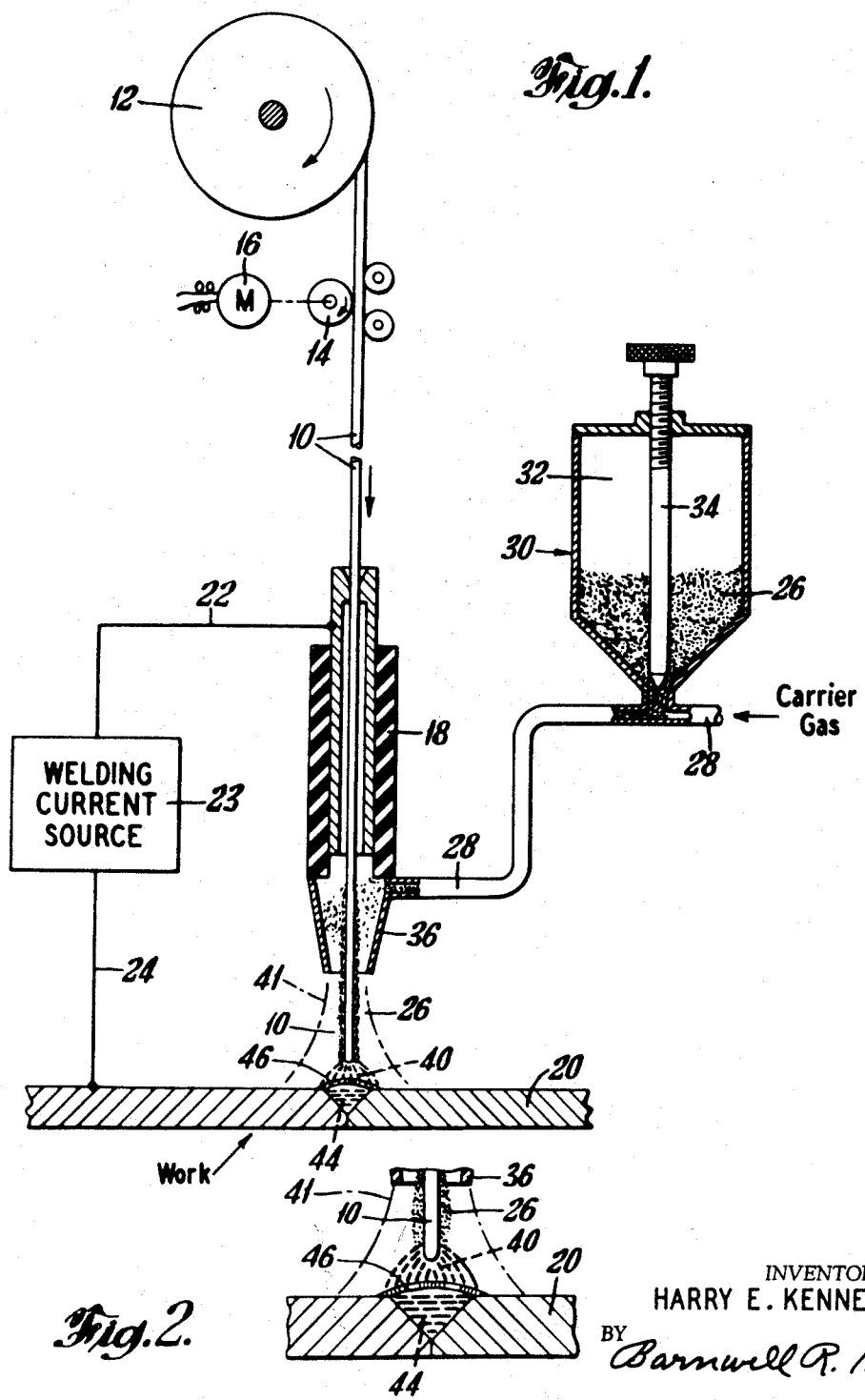

This application is a continuation-in-part of my co-pending application Serial No. 856,194, filed November 30, 1959 (now abandoned), which is a division of my application Serial No. 662,139, filed May 28, 1957 (now abandoned), the latter being a continuation-in-part of my application Serial No. 481,906, filed January 14, 1955 (now abandoned).

The present invention relates to improvements in the art of work-in-circuit electric arc welding with a consumable metal electrode.

The invention provides a process of electric arc welding wherein a metal electrode and a metal workpiece are connected to a source of welding current. The process comprises feeding said electrode toward said workpiece to establish and maintain an arc and welding zone between said electrode and said workpiece; and continuously delivering in a stream of shielding gas, metal-halide containing substantially non-gas-evolving granular composition having a substantially non-gas-evolving magnetic component, sufficient to cause such granular non-gas-evolving composition to be attracted as a coating on said electrode when the composition is so fed in a stream around said electrode, due to the magnetic field generated by the welding current flowing through said electrode; continuously feeding said stream around said electrode. The gas stream thus shields said arc and welding zone, and said welding composition is carried as a coating on the electrode; the rate of supply of said composition being coordinated with the rate of fusion of said electrode so that the ratio thereof is less than one.

The welding operation is protected from adjacent ambient air substantially entirely by such shielding gas stream as distinguished from gas evolved as a result of fusion of the magnetized composition granules in the weld zone, thereby minimizing the amount of composition required in the operation while, at the same time, improving the quality, appearance and shape of the resulting weld, as well as increasing the stability, speed and resistance to wind, and also reducing spatter and the cost of welding compared to the prior art.

The invention also provides a fusible, non-gas-evolving granular welding composition for use in the arc welding process hereinabove set forth, consisting essentially of non-gas-evolving granules substantially free of hydrogen, nitrogen, and compounds affording such gases in the arc zone. The non-gas-evolving granules comprise an agglutinized substantially uniform mixture of finely divided, metal-oxide non-gas-evolving slag-forming material and an amount of non-gas-evolving magnetizable material sufficient to cause such granules to cling to a current-carrying welding electrode under the influence of its surrounding magnetic field. The composition is characterized in that such granules evolve substantially no gas when fused in welding, thereby increasing their magnetic attractivity while reducing the quantity thereof required for welding in the protective gas.

Thus, the present invention provides an entirely novel concept of gas-shielded consumable electrode arc welding in which the welding operation takes place under a slag-forming magnetic flux which is substantially non-shielding-gas-evolving. This advances the art by changing the source of the shielding gas from the magnetic granular flux to an external source, i.e., a gas shielding stream. Eliminating gas-forming constituents from the granular magnetic flux, substantially increases the range and variety of ingredients possible in the flux, which is quite an important and unexpected result.

The general aim or object of the present invention is to provide a process of electric arc welding which has all of the versatility of covered electrode welding as regards position, as well as affording the high quality of welds characteristic of covered electrode welding, yet which can be carried out with lower cost of consumable materials and at substantially higher rates of deposition.

To put it another way, it is my aim to provide a process of welding in which a continuous bare metal electrode or wire may be used along with a separately supplied granular welding composition, yet which can be conducted as a manual operation in all positions, rather than simply downhand as has been the case with submerged melt welding.

The ability of the presently disclosed process to withstand drafts and winds of considerable strength without adverse effect on the weld is also of great importance.

A further object of my invention is to provide an improved welding process which will produce a weld having excellent physical properties, good contour, and smooth appearance, which will have a high rate of weld metal deposition per man hour, which will be adaptable to all positions of welding, usable either by hand or by automatic machine, have reduced spatter, and be capable of employing a continuous bare electrode.

It is contemplated that the present invention will furnish a highly advantageous substitute for manual covered electrode welding. It can moreover be employed to advantage in many automatic welding installations and in some such instances could even supplant submerged melt welding.

A further object of the present invention is to provide a novel magnetic non-gas-evolving welding composition, suitable for my new process.

Other objects and advantages of the present invention will become apparent as the following description proceeds, taken in connection with the accompanying drawings, wherein:

FIGURE 1 is a schematic illustration of apparatus for carrying out the process of the present invention.

FIGURE 2 is an enlarged view mainly in cross-section, of the arc zone shown in FIG. 1.

In carrying out the process of the present invention, an electric arc is established between a metallic workpiece and a metallic electrode with current flowing through the portion of the latter adjacent to the arc with the consequent establishment of a magnetic field around that portion of the electrode. The current carrying portion of the electrode and the arc zone are ensheathed or shielded by a stream of gas which is flowed along the electrode to the arc zone.

A finely divided non-gas-evolving composition, the granules of which contain suitable slag forming constituents fusible in the arc to form a protective slag covering on the weld metal and with a sufficient proportion of a non-gas-evolving magnetizable material to cause a substantial amount of the composition to cling to the portion of the electrode under the influence of the magnetic field, is simultaneously introduced into proximity with the electrode.

In a preferred form of the process, the finely divided welding composition is introduced into the stream of gas and is propelled thereby into proximity with the current carrying portion of the electrode. The gas, after propelling the magnetizable non-gas-evolving coating to the electrode, is then distributed about the arc zone as a shield.

The invention is characterized by the fact that the welding operation is protected from adjacent ambient air substantially entirely by such shielding gas stream as distinguished from gas evolved as a result of fusion of the composition granules in the weld zone, thereby minimizing the amount of composition required in the operation while, at the same time, improving the quality, appearance and shape of the resulting weld, as well as increasing the stability, speed, and resistance to wind and also reducing spatter and the cost of welding compared to the prior art.

Using a suitable finely divided non-gas-evolving welding composition with a magnetizable component in correct proportion, a suitable shielding gas at proper rate of flow properly distributed around the electrode, and a correct correlation of welding rod electrode size with the desired rate of melting, welding current, ratio of composition to rod per unit time, and ratio of gas to composition, all as specifically described hereinafter, the performance of the process of this invention compares favorably with prior processes, and possesses their desirable characteristics in at least the following respects: The visibility, all-position utility, and good quality results of hydrogen-free coated electrode welding; the adaptability to higher welding currents, the continuous (long), bare electrode wire, the heavier (thicker) deposits of high-quality weld metal in each single welding pass, and the speed, convenience and high-quality welds of submerged-melt welding; the visibility, use in all welding positions, and adaptability for hand welding of covered electrode welding in general; and the visibility, convenience and continuous-electrode advantages of inert-gas shielded welding with a consumable electrode.

In addition to the above characteristics, the process of this invention affords improved shielding at less cost for welding iron and steel, less spatter at higher current densities, a more stable arc, heavier deposits per pass, and with no position restrictions. In comparison with the previously proposed use of a gas-evolving flux having a magnetic component, the process of this invention provides greater resistance to drafts or winds, a substantially lighter burden of flux on the weld, less smoke, fumes and dust, and greater utility for welding in all positions.

THE SHIELDING GAS

The shielding gas is supplied in a confined stream from a suitable remote source (such as a supply cylinder) to a point on the electrode displaced from the arc zone and weld metal puddle. The stream of gas so supplied surrounds the current carrying portion of the electrode and, while traveling along the same in an unconfined stream, ensheaths the tip of the electrode. The stream, continuing along such path, also ensheaths the arc zone and substantially blankets the puddle of weld metal as well as a portion of the deposited weld metal adjacent the molten weld metal. As one of its primary functions, the shielding gas physically displaces the atmospheric gases (in particular oxygen and nitrogen) from around the arc zone and molten weld metal. Another primary function of the shielding gas is to insure an ionizable atmosphere in the arc zone of uniform composition with the result that improved arc characteristics are obtained. The required rate of gas flow for any particular welding operation is determined as that rate which gives an effective shielding and this rate depends upon the size of the molten weld metal puddle, the type of metal being welded, the type of gas used, the welding speed, and the strength of drafts and wind in the vicinity of the welding operation.

The gas or gases which are useful as a shielding gas in my process are preferably of a type which are substantially free of hydrogen or hydrogen producing compounds such as water vapor (to prevent the formation of fissures, cracks or porous weld metal deposits) and are also free of ntrogen or nitrogen producing compounds (to prevent porosity and the introduction of nitrides into the weld metal with the resultant undesirable formation of brittle welds having poor physical properties). The gas should be non-toxic. The gas should also be of a nature to provide effective shielding at economical flow rates and should not interfere with, and preferably should enhance, the stability of the arc.

I have found that gaseous carbon dioxide as well as the inert gases argon and helium are particularly useful as shielding gases in my process. Of these gases, I prefer to use carbon dioxide for the reason that it gives excellent welds and is much less expensive than the inert gases argon and helium. It is possible, of course, to mix any two or more of these three gases to provide a shielding gas mixture. Even though the carbon dioxide used as a shielding gas dissociates into carbon monoxide and oxygen at the temperatures existing in the arc zone, the liberated oxygen is prevented from having a deleterious effect on the weld by the welding composition which is also required in the instant process for a variety of other purposes.

There are indications that the use of carbon dioxide in the presently disclosed process provides an arc which is smoother and more stable in its operation as compared to the character of the arc when either of the inert monatomic gases, argon and helium, are used. This may be connected with the fact that the dissociation of the carbon dioxide is endothermic in character and hence may serve to lower the temperature of the arc. Further, I have found that the use of carbon dioxide in a reasonable rate of flow provides an effective shield against drafts and winds even as high as 7 miles per hour.

In order to provide an adequate shielding effect, it is desirable that the stream of shielding gas be made to flow in a substantially laminar and non-turbulent manner, and in a quantity sufficient to envelop the arc zone completely. The quantity of the shielding gas used in my process can vary according to the conditions surrounding the welding operation. I have found, however, that a flow rate within the range of 10 to 40 cubic feet per hour, depending upon the welding position (e.g., downhand, vertical, horizontal or overhead), the particular gas used, and the strength of air currents in sufficient to give excellent welds.

The shielding gas is supplied to the arc zone from any suitable commercial source, for example, pressurized cylinders of the type presently in use in portable hand welding operations. The shielding gas is confined within suitable conduits and is carried into proximity with the electrode at a point spaced from the arc zone. Surrounding the electrode, the protective shielding gas is in a laterally unconfined stream and, accordingly, it can be seen that the gas will remain in this stream so long as its flow is relatively laminar and non-turbulent. The gas will flow smoothly around the electrode and thence around the arc and over the puddle of molten weld metal and the deposited weld metal adjacent the puddle, affording its protection to all of these areas.

THE WELDING COMPOSITION

For use in the present process the non-gas-evolving composition must be sufficiently magnetizable that it will be attracted to the welding rod and at least a substantial portion of the quantity supplied will cling to the rod as a sheath under the influence of the magnetic field set up by passage of the welding current in the rod. Such property may be imparted to the composition by incorporating in it a magnetizable but non-gas-evolving material such as powdered iron, cobalt, nickel or a ferrite, for example, magnetite ($Fe_3O_4$), manganese ferrite, calcium ferrite, magnesium ferrite, and other metal ferrites having a suitable magnetic permeability.

Iron oxides will be present in the weld zone if a ferrite is used as the magnetizable material. There may be some oxidation of the powdered iron if it is used to give the required magnetic properties to the composition. Iron oxide is also likely to enter the weld zone from the surface of the plates being welded. Some means must be provided to prevent the iron oxide from dissolving in the weld metal and attacking its carbon. That can, I have found, be effectually accomplished by incorporating in the composition deoxidizers and stable oxides which will react with the oxides of iron to form compounds that will be non-reactive with respect to the weld metal. Suitable deoxidizers are hereinafter described.

As to stable oxides of the class required, titania ($TiO_2$) may be incorporated in the composition for the indicated purpose. It reacts in the welding zone with the iron oxide to form an iron titanate. Similarly, silica ($SiO_2$) may be used to form iron silicate. The iron titanate, or silicate, so formed, serves a desirable purpose in that it floats as a protective slag on the surface of the weld metal, protecting it from the atmosphere. Titania has the additional advantage that when it is used in the composition a smoother or quieter arc results.

To enhance the surface smoothness and shape of the weld deposit, other slag forming constituents may be incorporated in the composition. They should be of a character *not* to evolve deleterious gases, particularly nitrogen or water vapor. It is not advantageous to have them evolve any shielding or protective gas, since the quantity of gas so realized will necessarily be minor compared to the quantity of shielding gas required and independently supplied unless an attempt is made to use an inordinate quantity of composition. However, the present invention is characterized in that the composition granules evolve substantially *no* gas when fused in welding, thereby increasing their magnetic attractivity while reducing the quantity thereof required for welding in a protective gas.

Prefused or preformed silicate compositions such as have heretofore been employed in submerged melt welding may be incorporated in the present composition for the indicated purposes, namely, to modify the shape and surface appearance of the weld, those which have a high manganese content having proved particularly desirable. Some of the silicates which can be successfully employed are the silicates of manganese, iron, aluminum, calcium, zirconium, potassium, sodium, lithium, barium, strontium or mixtures thereof.

It is desirable to produce weld deposits having the surface smoothness and shape of the weld deposits produced by the submerged melt process. For this purpose the slag produced by the welding composition employed in the present process should be one of suitable fluidity or viscosity to provide adequate coverage and protection to the weld deposit while providing a smooth, flat, clean weld deposit. A slag having a viscosity in the range of 2 to 25 poises at 1500° C. produces a satisfactory weld deposit. I have observed that as the viscosity of the molten slag decreases that the weld deposit becomes increasingly flat, whereas with increased viscosity the weld deposit becomes narrower and higher.

The slag produced from the welding composition should also be such that it is readily removable from the weld deposit when cold. Such a slag possesses one or more of the following characteristics: (1) a coefficient of expansion different from that of the weld metal, (2) a sharp freezing point, and (3) does not produce a binding compound at the interface between the slag and the metal.

The slag forming constituents of the composition serve to combine with, dissolve or otherwise render harmless those products of the welding operation which would otherwise interfere with the attainment of weld metal having desirable mechanical or physical properties. Secondly, the final slag also serves as a protective covering on the weld metal, excluding the atmosphere during cooling. Thirdly, the slag also serves to mold and shape the surface of the weld deposit, desirably in a smooth contour which merges at its edges into the parent metal without undercutting.

Deoxidizers, such as silicomanganese, ferrosilicon ferromanganese and aluminum are suitable for use in the composition to aid in reducing such oxygen as is evolved in the welding zone. The oxides formed by the deoxidizers are reacted with titania or silica in the composition and enter the slag as titanates or silicates. Additionally, alloying agents for modifying the metallurgy of the weld metal may be incorporated if desired.

The addition of fluorides such as cryolite (sodium aluminum fluoride) appears to enhance the ability of the process to withstand the effects of air currents. Fluorspar (calcium fluoride) gives a similar effect. The greater fluidity which the fluoride imparts to the slag appears to play a part in affording good operation despite air currents or drafts of considerable magnitude.

The welding composition also plays a part in the welding action itself, affecting as it does, arc stability and other phenomena in the arc zone. The complex nature of the arc phenomena makes it difficult to trace the functional relations in the welding zone of individual constituents, however.

As to the proportions of the constituents in the composition, the minimum quantity of magnetizable material which may be used is that amount which will lend sufficient magnetizable effect to the whole that it will cling to the rod in an adequate sheath. This ranges upward from about ten percent. The proportion of titanium oxide or equivalent must be at least great enough to render harmless the iron oxides entailed from the magnetizable material or other sources. The proportions of other slag forming constituents will depend upon the materials selected and the surface characteristics and weld shape desired.

In preparing the composition, the constituents are finely ground and thoroughly intermixed to yield a homogeneous mixture in which the magnetic material is dispersed throughout the whole. Such mixing can be entirely mechanical for some selected compositions. In other instances silicates are preformed by fusion and then mixed mechanically with the other constituents. In still other cases the magnetite, if selected as the magnetizable material, can be incorporated by prefusion in the prefused silicate as the latter is formed to constitute a magnetizable silicate composition.

The constituents are, whether some of them are preformed by fusion or not, thoroughly mixed and then bonded together by a binder or agglutinate such as sodium silicate and potassium silicate. The bonded material is dried and ground to suitably sized granules, care being exercised to minimize conversion of magnetic $Fe_3O_4$ to non-magnetic $Fe_2O_3$ and to avoid oxidizing the deoxidizer present in the composition.

The sizing of the constituents should be fine enough to insure uniform composition in each granule of the finished product. A sizing of 32 x D is suitable. The final granules on the other hand should be of a size for ready conveyance in the gas stream and to form a compact, clinging sheath on the rod. A particle size which passes through a 20 mesh screen has been found satisfactory. This size is commonly referred to as a 20 x D size. Generally, particle size of 48 x 200 mesh is predominant in such a mixture. The bulk density per apparent specific gravity should be in the range of 90 to 250 pounds per cubic foot.

The compositions set forth in Table II below will serve to illustrate compositions suitable for employment in the process of the present invention for the welding of carbon steels. It should be noted that the raw materials, i.e., the commercial form in which the named constituents are available, generally include other substances present as impurities. The materials used to make my compositions may be the commercial grade containing the usual impurities although care should be exercised to avoid sources of deleterious gases such as hydrogen and nitrogen.

In the case of some of the illustrative compositions, a portion of the ingredients are first prefused and reacted to provide non-gas-evolving slag forming substances. In Table I, the proximate analysis of some of such prefused but non-magnetic materials is given.

*Table I*

| Ingredient | Percent | |
|---|---|---|
| | A | B |
| $SiO_2$ | 38.5 | 33.0 |
| $Al_2O_3$ | 4.5 | 20.0 |
| MnO | 42.0 | 28.5 |
| MgO | 1.0 | 1.0 |
| CaO | 6.5 | 8.5 |
| $Fe_2O_3$ | 2.0 | 3.5 |
| $CaF_2$ | 5.5 | 5.5 |

It will be recognized that the non-gas-evolving compositions shown in Table I are non-magnetic. Experiments have shown that a wide variety of other non-gas evolving compositions are also suitable for use in lieu of those listed above. For example, the calcium magnesium aluminum silicate compositions have been found useful as a prefused silicate component of the welding composition of the present process. The constituents of the prefused silicate, such as those of Table I are fused at a suitable temperature (for example, in an electric furnace) and the fused product is ground to a particle size appropriate for use as a non-magnetic constituent in the welding composition of the present invention. A particle size which will pass through a 32 mesh screen (a particle size referred to as 32 x D) is a presently preferred size.

In Table II are listed a number of illustrative magnetic non-gas-evolving welding compositions which have been found useful in the presently disclosed process and some of which incorporate, as will be seen, one of the preliminarily prepared compositions of Table I. Again, commercial grades of raw materials may be used to produce these compositions. Quantities are stated in percent, by weight, of the total composition.

*Table II*

| Ingredient | Composition No. | | | | | | | | | |
|---|---|---|---|---|---|---|---|---|---|---|
| | 1 | 2 | 3 | 4 | 5 | 6 | 7 | 8 | 9 | 10 |
| Prefused A | 58.5 | 70.1 | 28.0 | 20.6 | 28.8 | | | | | |
| Prefused B | | | | | | 40.8 | 43.1 | | | |
| $TiO_2$ | | | 23.8 | 17.5 | 24.5 | 20.8 | 21.9 | 11.7 | | 24.7 |
| $SiO_2$ | | | | | | | | | 4.3 | |
| $Al_2O_3$ | | | 5.6 | 4.1 | | | | 17.0 | 2.0 | 10.3 |
| Cryolite | | | 5.6 | 12.4 | | | | | | |
| $CaF_2$ | 6.4 | | | | 5.4 | | | 2.1 | 21.7 | 20.2 |
| Fe | | 21.0 | 28.0 | 30.9 | 28.8 | | | | | |
| $Fe_3O_4$ | 14.4 | | | | | 20.1 | 21.2 | 21.2 | 19.7 | |
| FeMn | 13.6 | 5.3 | 5.6 | 4.1 | | 4.3 | | | 10.5 | 2.2 |
| FeSi | | 1.8 | 1.4 | | | | | | 5.3 | 9.4 |
| Al | | | | 1.8 | 2.5 | | 6.6 | | | |
| SiAl | | | | | | 6.9 | | 1.1 | | |
| ZrSi | | | | 4.5 | 4.3 | | | | | |
| FeTi | | | | | | | | | 7.2 | |
| SiC | | | | | | | | 1.1 | | |
| MnO | | | | | | | | 10.6 | | |
| $CaCO_3$ | | | | | | | | 4.3 | 23.6 | 29.6 |
| Asbestos | | | | | | | | 22.3 | | |
| Graphite | | | | | | | | | .39 | |
| Sod. silicate | 7.1 | 0.9 | 2.0 | | | 3.55 | 3.6 | 8.6 | 5.3 | 3.6 |
| Pot. silicate | | 0.9 | | 4.1 | 5.7 | 3.55 | 3.6 | | | |

In the case of Composition No. 1 in Table II, the magnetic magnetite ($Fe_3O_4$) is incorporated in the prefused non-magnetic composition A in the course of the latter's formation. Care is exercised at such time to prevent conversion of the magnetic $Fe_3O_4$ to non-magnetic $Fe_2O_3$.

PRACTICE OF THE PROCESS

Apparatus suitable for practicing the method of the invention is shown in the drawing.

As there shown, a metal welding rod or wire 10 is drawn from a reel 12 by rod feed means 14, driven by variable speed motor 16, and fed through a welding torch or gun 18 toward a workpiece 20. A power cable 22 passes from a welding current source 23 to gun 18 where it energizes rod 10, while a similar cable 24 is connected to workpiece 20 to complete the electric welding circuit. Granular or powdered non-gas-evolving magnetic composition 26 is propelled to the gun 18 in the shielding gas stream through conduit 28. The granular composition is introduced into the shielding gas through a dispenser 30 in the gas stream. Dispenser 30 comprises a closed hopper 32 in which the granular composition 26 is stored and a metering valve 34 which controls the rate of flow of the composition into the carrier gas stream. The dispenser 30 may be of any type known to the art, the gravity feed type of the drawing being shown merely as an illustration.

The granular welding composition 26 passing from the hopper 32 of the dispenser 30, passes into and is propelled by the carrier gas stream through the conduit 28 which communicates with a nozzle 36 of the welding gun 18.

As rod 10 is struck to the workpiece 20 to initiate an arc 40 and begin the welding operation, the above described shielding gas is discharged from the nozzle 36 around the rod 10 to form a shielding envelope 41 around the arc 40. The above described magnetizable welding composition 26 is propelled into the nozzle 36 of the welding gun 18. Due to its magnetizable component, the composition so delivered is attracted to the current-carrying electrode or rod 10. The composition, being bound in the form of homogeneous particles with the magnetizable component, forms a substantially uniform coating or sheath on the electrode, and is held thereto under the influence of the magnetic field set up around the rod by the welding current flowing through it. The welding composition is fused without the evolution of gas along with the electrode rod 10 and passes into the weld puddle 44, and forms a protective layer of molten slag 46 on the weld deposit.

The process of the invention has been successfully employed with direct current welding sources of both straight and reverse polarities, and with alternating current welding sources, to weld a wide variety of steels, and is particularly applicable to the welding of carbon steels. Manual welding applications employing the process of the invention have been successfully performed in the downhand, vertical, horizontal and overhead positions. It will be understood that when the position of the welding operation is changed, it may be necessary to change the welding conditions, such as the rate of flow for the composition to compensate for the effect of the force of gravity on the flow of the welding composition.

In the practice of the present invention, welding currents as high as about 1000 amperes have been used. In operation, it is desirable to use a relatively small electrode in order to afford maximum flexibility. A 3/32" rod has been found quite suitable for many applications with currents of 300 to 600 amperes. However, larger or smaller sizes of rod or wire may be employed without any difficulty. The rod size used with any particular current determines the current density in the rod.

A low current density promotes a globular type of metal transfer such as is required when welding on overhead or vertical surfaces, whereas a high current density causes metal transfer in more of a fine spray which is desirable in high-speed, downhand welding to afford a deposit of uniform section even at the high speeds. The quantity of the protective gas can vary under certain conditions, but should be within the range of 10 to 40 cubic feet per hour, depending upon the type of welding and also the strength of surrounding air currents. The welding current, of course, can be varied at the will of the operator, to produce ideal welding conditions.

Another desirable feature of the present invention is that the quantity of coating can be varied, and as the speed of translation of the electrode is reduced, the quantity of composition can be reduced. This is also true if the weld is being made in a groove instead of a surface bead. The quantity of granular coating composition required may be in some instances as low as 0.2 pound of coating per pound of rod deposited. In the prior art covered electrode technique, in order to obtain the desired physical qualities, there is a limit to the thickness of bead that can be deposited in one pass.

In the case of the present process, on the other hand, 1/2" plate, for example, can be welded in two or three passes or more without adversely affecting the physical properties of the weld metal. This feature is of particular importance owing to the fact that there is a limit to the speed at which an operator can manipulate the electrode in a transverse direction.

In the practice of my invention, direct current may be used, with a constant potential, rising, or drooping volt-ampere characteristic. The selection of the type of direct current will, of course, be determined by the available equipment in some cases and on the type and nature of the welding application. Alternating current can also be used. The welding voltages used in my process are within the normal range of welding voltages used in coated electrode welding processes, and are in the range of from about 20 to about 35 volts.

In Table III are shown a number of applications of the process of the present invention to the welding of carbon steels:

The mechanical properties of the weld metal of the invention are better than the standards set up in the welding industry for welds in carbon steels by coated metal arc welding processes. (The minimum standards for welds in carbon steels are a yield strength of 52,000–55,000 p.s.i., a tensile strength of 62,000–68,000 p.s.i., and an elongation in 2 inches of 17–25%, as shown in the "Welding Handbook," 3rd Ed., American Welding Society, New York, 1950, at page 1512.) Moreover, the physical properties shown in Table III are comparable to the physical properties of welds produced by the submerged melt welding process in carbon steels (see for example, the "Welding Handbook" at page 282).

Welding Composition Number 5 (Table II) was found to offer the maximum resistance to drafts and produced sound welds with ambient winds of up to about ten miles per hour velocity.

It is, of course, to be understood that the granular non-gas-evolving composition having a non-gas-evolving magnetic component may also be fed from a hopper by gravity directly to the electrode in lieu of being propelled by the shielding or other gas and so deposited as a coating on the electrode. In such case the shielding gas should be fed around the coated electrode in the vicinity of the weld to shield the arc and weld zones from atmospheric contamination. This procedure, however, is adaptable only to substantially downhand position welding.

In addition, where the granular welding composition is propelled by a shielding gas stream, and so conveyed to the electrode, a second independent stream of shielding gas may be employed around the arc and welding zones to supplement the first mentioned gas stream for shielding purposes.

What is claimed is:

1. The process of electric arc welding wherein a metal electrode and a metal workpiece are connected to a source of welding current, said process comprising feeding said electrode toward said workpiece to establish and maintain an arc and welding zone between said electrode and said workpiece; continuously delivering in a stream of shielding gas, metal-halide containing non-gas-evolving granular composition have bonded in each granule a non-gas-evolving magnetic component of at least 10%, by weight, sufficient to cause such granular non-gas-evolving composition to be attracted as a coating on said electrode when the composition is so fed in a stream around said electrode, due to the magnetic field generated by the welding current flowing through said electrode; continuously feeding said stream around said electrode, whereby said gas stream shields said arc and welding zone and said welding composition is carried as a coating on said electrode; and coordinating the rate of supply of said composi-

*Table III*

WELDING CONDITIONS

| Welding composition (from Table II) | 1 | 2 | 3 | 4 | 5 | 6 | 7 | 8 | 9 |
|---|---|---|---|---|---|---|---|---|---|
| Particle size, mesh | 20 x D | 20 x D | 20 x D | 20 x D | 20x D | 20 x D | 20 x D | 20 x D | 20 x D |
| Work thickness, inches | 1/2 | 1/2 | 1/2 | 1/2 | 1/2 | 1/2 | 1/2 | 1/2 | 1/2 |
| Rod type | | #29 | #29 | #29 | #29 | #29 | #29 | #43 | #43 |
| Rod diameter, inches | 3/32 | 3/32 | 3/32 | 3/32 | 3/32 | 3/32 | 3/32 | 3/32 | 3/32 |
| Composition rate, pounds/hour | | 6.0 | 4.4 | | | | | | |
| Welding current, D.C. amps | 300 | 300 | 300 | 300 | 300 | 300 | 300 | 300 | 300 |
| Welding voltage, volts | 25.5 | 27 | 30 | 27–29 | 30–32 | 31–35 | 31–33 | 27–29 | 25 |
| Rod feed rate, in./min | | 70 | 77 | | | | | | |
| Welding rate, in./min | | 7 | 8 | | 8 | 8 | 8 | 8 | 6 |
| Gas | $CO_2$ | $CO_2$ | $CO_2$ | $CO_2$ | | | | | |
| Gas flow rate, c.f.h | 20 | 20 | 30 | | | | | | |
| Passes | 7 | 7 | 5 | | 6 | 5 | 6 | 5 | 7 |
| Pounds composition/pounds rod | 0.6 | 0.73 | 0.49 | | | | | | |

WELD PROPERTIES

| | | | | | | | | | |
|---|---|---|---|---|---|---|---|---|---|
| Yield strength, p.s.i | 57,200 | 65,400 | 66,100 | 60,000 | 63,700 | 59,300 | 56,300 | 62,700 | 73,200 |
| Tensile strength, p.s.i | 70,400 | 85,400 | 79,100 | 80,000 | 80,600 | 78,000 | 70,900 | 82,700 | 93,500 |
| Elongation, percent | 33 | 25 | 29 | 30 | 17.3 | 20.0 | 17.3 | 30.6 | 24.0 |
| Reduction of area, percent | 65 | 56 | 61 | 60 | 25 | 24.2 | 23.6 | 62.5 | 60.0 | tion with the rate of fusion of said electrode so that the ratio thereof is less than one; such welding operation being protected from adjacent ambient air substantially entirely by such shielding gas stream as distinguished from gas evolved as a result of fusion of such magnetized composition granules in the weld zone, thereby minimizing the amount of composition required in the operation while, at the same time, improving the quality, appearance and shape of the resulting weld, as well as increasing the stability, speed, and resistance to wind, and also reducing spatter and the cost of welding compared to the prior art.

2. The process of electric arc welding which comprises establishing and maintaining an electric arc between a metallic workpiece and a metallic electrode with current flowing through the portion of the latter adjacent the arc and with the consequent establishment of a magnetic field around said portion of the electrode, continuously delivering a stream of shielding gas to said portion of the electrode in a manner of flow along the same toward the arc zone in a stream ensheathing the electrode, and continuously introducing into proximity with said portion of said electrode a finely divided non-gas-evolving composition, the granules of which contain slag-forming constitutents fusible in the arc to form a protective slag covering on the weld metal and having incorporated in each granule a sufficient proportion of non-gas-evolving magnetizable material to cause a substantial amount of the composition to cling as a coating to said portion of said electrode under the influence of said magnetic field and, so clinging, to be conveyed by said electrode to the arc zone where the entering portion of the electrode and its clinging coating are fused substantially without the evolution of gas substantially simultaneously in the arc; such welding operation being protected from adjacent ambient air substantially entirely by such shielding gas stream as distinguished from gas evolved as a result of fusion of such magnetized composition granules in the weld zone, thereby minimizing the amount of composition required in the operation while, at the same time, improving the quality, appearance and shape of the resulting weld as well as increasing the stability, speed, and resistance to wind, and also reducing spatter, and the cost of welding compared to the prior art.

3. The process of electric arc welding which comprises establishing and maintaining an electric arc between a steel workpiece and a steel electrode with current flowing through at least a portion of the latter adjacent the arc and with the consequent establishment of a magnetic field around said portion of the electrode, ensheathing said portion of the electrode in a stream of shielding gas flowed along the same to the arc zone, said shielding gas being selected from the group consisting of carbon dioxide, argon, helium and mixtures thereof and introducing into proximity with said portion of said electrode a finely divided metal-halide containing non-gas-evolving composion which contains slag-forming constituents fusible substantially without the evolution of gas in the arc to form a protective slag covering on the weld metal, each particle of said composition including non-gas-evolving magnetizable material in an amount sufficient to cause a substantial proportion of the composition so supplied to cling as a coating to said portion of the electrode; such welding operation being protected from ambient air substantially entirely by such shielding gas stream as distinguished from gas evolved as a result of fusion of such finely divided composition in the weld zone.

4. The process of electric arc welding which comprises establishing and maintaining an electric arc between a steel workpiece and a steel electrode with current flowing through at least a portion of the latter adjacent the arc and with the consequent establishment of a magnetic field around said portion of the electrode, ensheathing said portion of the electrode in a stream of shielding gas flowed along the same to the arc zone at a rate of from about 10 to about 40 cubic feet per hour, said shielding gas being selected from the group consisting of carbon dioxide, argon, helium, and mixtures thereof, and introducing into proximity with said portion of said electrode a finely divided metal-halide containing non-gas-evolving composition which contains metal-oxide slag-forming constituents fusible substantially without the evolution of gas in the arc to form a protective slag covering on the weld metal, each particle of said composition including non-gas-evolving magnetizable material in an amount sufficient to cause a substantial proportion of the composition so supplied to cling as a coating to said portion of the electrode, said composition having a bulk density of from about 90 to about 250 pounds per cubic foot and being in granules small enough to pass through a size 20 mesh screen, and said slag covering having a viscosity when molten of from about 2 to about 25 poises at 1500° C., such welding operation being protected from ambient air substantially entirely by such shielding gas stream as distinguished from gas evolved as a result of fusion of such finely divided composition in the weld zone.

5. The process of electric arc welding which comprises establishing and maintaining an electric arc between a steel workpiece and a steel electrode with current flowing through at least a portion of the latter adjacent the arc and with the consequent establishment of a magnetic field around said portion of the electrode, establishing a supply of free-flowing, granular metal-halide containing non-gas-evolving composition in which each granule comprises substantially uniformly an agglutinized bonded mixture of at least one finely divided metal-oxide non-gas-evolving slag-forming material selected from the class consisting of manganese oxides and manganese silicates, a metallurgical deoxidizer, and at least about 10% of finely divided non-gas-evolving magnetizable material, directing a confined stream of gaseous carbon dioxide to the end portion of said electrode at a rate of from about 10 to about 40 cubic feet per hour and discharging such gas in a substantially non-turbulent, unconfined stream enveloping said portion of the electrode and directed toward the arc zone, continuously withdrawing composition from said supply into said confined stream and thereby propelling said composition into proximity with said portion of said electrode where it emerges in said unconfined stream to cling to said electrode under the influence of said magnetic field and fuse substantially simultaneously with said electrode in the arc zone, and coordinating the rate of supply of said composition with the rate of fusion of said electrode to provide a ratio thereof of less than one; such welding operation being protected from ambient air substantially entirely by such shielding gas stream as distinguished from gas evolved as a result of fusion of such finely divided composition in the weld zone.

6. The process of claim 5 in which the effects of drafts or air currents on the arc are minimized by including a metal fluoride in said composition.

7. The process of claim 5 in which the granular composition has a bulk density of from about 90 to 250 pounds per cubic foot and the granules are small enough to pass through a 20 mesh screen.

8. The process of claim 5 in which the slag-forming constituents of the composition also include titanium dioxide whereby the arc is rendered smoother and quieter.

9. A metal halide containing non-gas-evolving granular welding composition wherein the individual granules comprise, substantially uniformly, at least one metal-oxide non-gas-evolving slag-forming material and an amount of non-gas-evolving magnetizable material of at least 10% by weight, sufficient to impart substantial magnetic properties to each of said granules, characterized in that such composition granules evolve substantially no gas when fused in welding, thereby increasing the magnetic attractivity while reducing the quantity thereof required for welding in a protective gas.

10. A metal-halide containing non-gas-evolving granular welding composition for use in the arc welding process hereinabove set forth, which consists essentially of non-gas-evolving granules each comprising, substantially uniformly, a bonded mixture of finely divided metal-oxide non-gas-evolving slag-forming material and an amount of non-gas-evolving, magnetizable material of at least 10%, by weight, sufficient to cause such granules to cling to a current-carrying welding electrode under the influence of its surrounding magnetic field, characterized in that such composition granules evolve substantially no gas when fused in welding, thereby increasing the magnetic attractivity while reducing the quantity thereof required for welding in a protective gas.

11. The metal-halide containing non-gas-evolving granular welding composition of claim 10 wherein the metal-oxide non-gas-evolving slag-forming and magnetizable material of each granule are bonded together by a siliceous binder.

12. The granular metal-halide containing non-gas-evolving welding composition of claim 11 wherein the siliceous binder comprises sodium silicate.

13. A granular metal-halide containing non-gas-evolving welding composition for use in the arc welding process hereinabove set forth, which consists essentially of non-gas-evolving granules each comprising, substantially uniformly, a bonded mixture of at least one finely divided metal-oxide non-gas-evolving slag-forming material selected from the class consisting of manganese oxides and manganese silicates, at least about 10% of a finely divided non-gas-evolving magnetizable iron-containing material selected from the class consisting of Fe and $Fe_3O_4$ and a metallurgical deoxidizer, characterized in that such composition granules evolve substantially no gas when fused in welding, thereby increasing the magnetic attractivity while reducing the quantity thereof required for welding in a protective gas.

14. The metal-halide containing non-gas-evolving granular welding composition of claim 13 which includes a metal fluoride.

15. A fusible, granular metal-halide containing non-gas-evolving welding composition for use in the process of arc welding set forth wherein the granules are of such size as to be readily conveyed in a gas stream and not larger than about 20 x D size, said composition having a bulk density of from about 90 to about 250 pounds per cubic foot and having substantially uniformly distributed throughout each non-gas-evolving granule a bonded mixture which comprises at least one metal-oxide non-gas-evolving slag-forming material selected from the class consisting of (1) titanium dioxide, (2) silicon dioxide, (3) oxides and silicates of metals selected from the group consisting of manganese, calcium, aluminum, iron and magnesium, and (4) silicates of metals selected from the group consisting of potassium, sodium, zirconium, vanadium, barium, strontium and lithium; and a finely divided non-gas-evolving magnetizable material; said mixture being bonded together by a suitable agglutinate to form said granules; and the slag formed upon fusion of said composition having a viscosity of from about 2 to about 25 poises at 1500° C., characterized in that such composition granules evolve substantially no gas when fused in welding, thereby increasing the magnetic attractivity while reducing the quantity thereto required for welding in a protective gas.

16. The fusible granular metal-halide containing non-gas-evolving welding composition of claim 15, wherein the granules contain a minor amount of at least 2%, by weight, of a metal fluoride.

17. The fusible granular metal halide containing non-gas-evolving welding composition of claim 13, wherein the granules contain a metallurgical deoxidizer selected from the class consisting of Al, Mn, Si, Ti, and Zr.

18. A fusible non-gas-evolving granular welding composition for use in the arc welding process hereinabove set forth, consisting essentially of non-gas-evolving granules substantially free of hydrogen, nitrogen, and compounds affording such gases in the arc zone and which each of the non-gas-evolving granules comprises, substantially uniformly, a bonded mixture of finely divided, metal-oxide non-gas-evolving slag-forming material and an amount (at least 10%) of non-gas-evolving magnetizable material sufficient to cause such granules to cling to a current-carrying, welding electrode under the influence of its surrounding magnetic field, characterized in that such composition granules evolve substantially no gas when fused in welding, thereby increasing the magnetic attractivity while reducing the quantity thereof required for welding in a protective gas.

19. The process of electric arc welding which comprises, establishing and maintaining an electric arc between a metal workpiece and a consumable metal electrode with current flowing through at least a portion of said electrode adjacent the arc whereby a magnetic field is established around said portion of the electrode, ensheathing said portion of said electrode with a stream of shielding gas by flowing the same along said portion of the electrode to the arc and the weld zone formed thereby, and delivering to the electrode as a component of said shielding gas stream a granular non-gas-evolving welding composition comprising substantially uniformly, in each granule mixture of magnetizable and non-magnetizable slag forming materials bonded together in finely divided solid form and in which composition said magnetizable material is in an amount sufficient to cause a substantial portion of said composition granules to separate from said shielding gas stream and cling magnetically as a coating to said electrode as a result of the magnetic field created around said electrode, characterized in that such composition granules evolve substantially no gas when fused in welding, thereby increasing the magnetic attractivity while reducing the quantity thereof required for welding in a protective gas.

20. Electric welding metal work, which comprises simultaneously drawing from a supply reel and feeding through a guide-tube in a welding torch, a solid metal wire having a electrically conductive surface, at a preselected wire feed speed; energizing a visible fusion welding zone between the end of such wire and the work with electric welding current flowing in a circuit which includes said guide-tube and the heated end portion of the so-fed wire leaving such guide-tube, and such work; the electric current which flows from the guide tube through the heated end portion of such wire, creating a field that attracts magnetic material to the exposed surface of such heated portion as it is so-fed toward the work; discharging a transparent stream of carbon dioxide gas from said torch around such wire end portion and in the same direction as the latter is fed toward the welding zone; and coating the so-fed exposed end portion only of the wire with non-gas-evolving slag-forming magnetic flux powder consisting of particles each of which is composed substantially uniformly, of metal-halide containing welding composition bonded together with metal-oxide slag-forming material selected from the class consisting of manganese oxide and manganese silicate, about 10% magnetic ferrous material selected from the class consisting of Fe and $Fe_3O_4$, about 2% metal fluoride, and at least 2% of metallic deoxidizer selected from the class consisting of Al, Mn, Si, Ti, and Zr, the maximum ratio of such powder coating on the so-fed wire, by weight, being of the order of ½, said powder being delivered to such torch along with such carbon dioxide gas and attracted below such guide-tube to such heated wire end portion by such exposed field, clinging to such portion and protecting the latter until it reaches such welding zone where it enters the welding zone with the wire and improves the welding action, leaving a light slag residue, without interfering with the visibility of the welding zone through the so-discharged transparent carbon dioxide gas stream which also protects the action from the ambient air, characterized in that such composition granules evolve substantially no gas when fused in welding, thereby increasing the magnetic attractivity while reducing the quantity thereof required for welding in such protective gas.

References Cited by the Examiner

UNITED STATES PATENTS

| | | | |
|---|---|---|---|
| 1,589,017 | 6/26 | Lincoln | 219—74 |
| 2,737,150 | 3/56 | Gayley | 219—146 |
| 3,051,822 | 8/62 | Bernard et al. | 219—74 |

FOREIGN PATENTS

| | | |
|---|---|---|
| 608,270 | 9/48 | Great Britain. |

RICHARD M. WOOD, *Primary Examiner.*

JOSEPH V. TRUHE, *Examiner.*